(12) United States Patent
Daniel et al.

(10) Patent No.: US 9,333,582 B2
(45) Date of Patent: May 10, 2016

(54) METHOD AND SYSTEM TO CONTROL HEAT INPUT IN A WELDING OPERATION

(71) Applicant: LINCOLN GLOBAL, INC., City of Industry, CA (US)

(72) Inventors: Joseph A. Daniel, Sagamore Hill, OH (US); Steven R. Peters, Huntsburg, OH (US); Daniel Fleming, Painesville, OH (US); Judah Henry, Geneva, OH (US); Tamara Savrin, Orange Village, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 392 days.

(21) Appl. No.: 13/797,108

(22) Filed: Mar. 12, 2013

(65) Prior Publication Data

US 2014/0124492 A1 May 8, 2014

Related U.S. Application Data

(60) Provisional application No. 61/723,522, filed on Nov. 7, 2012.

(51) Int. Cl.
*B23K 9/10* (2006.01)
*B23K 9/095* (2006.01)
*B23K 9/09* (2006.01)
*B23K 9/173* (2006.01)

(52) U.S. Cl.
CPC .................. *B23K 9/095* (2013.01); *B23K 9/092* (2013.01); *B23K 9/1006* (2013.01); *B23K 9/173* (2013.01)

(58) Field of Classification Search
USPC .................. 219/130.1, 130.01, 130.5, 130.51
See application file for complete search history.

(56) References Cited

U.S. PATENT DOCUMENTS

| | | | |
|---|---|---|---|
| 6,441,342 B1 * | 8/2002 | Hsu | 219/130.01 |
| 6,730,875 B2 * | 5/2004 | Hsu | 219/137 PS |
| 7,064,290 B2 * | 6/2006 | Blankenship et al. | 219/130.51 |
| 7,217,904 B2 * | 5/2007 | Blankenship et al. | 219/130.33 |
| 8,680,431 B2 * | 3/2014 | Stava et al. | 219/130.31 |

(Continued)

FOREIGN PATENT DOCUMENTS

RU 2006102342 A 8/2007

OTHER PUBLICATIONS

International Search Report and Written Opinion for International Application PCT/IB2013/002472, Applicant Lincoln Global, Inc., (2014) pp. 10.

*Primary Examiner* — Dana Ross
*Assistant Examiner* — Ayub Maye
(74) *Attorney, Agent, or Firm* — Perkins Coie LLP

(57) ABSTRACT

A system for and method of controlling the heat input in a welding operation are provided. The system includes an arc welding power supply configured to output a welding waveform to a welding torch. The welding power supply includes a waveform generator to generate an output welding waveform. The power supply also includes a controller to optimize the output welding waveform based on one of a desired RMS voltage set point and a desired RMS voltage range. The optimization is performed by adjusting at least one of a power ratio and a duration ratio. The power ratio is a ratio of a power of a negative portion of the welding waveform to a power of a positive portion of the welding waveform, and the duration ratio is a ratio of a duration of a negative portion of the welding waveform to a duration of a positive portion of the welding waveform.

20 Claims, 3 Drawing Sheets

(56) References Cited

U.S. PATENT DOCUMENTS

| | | | |
|---|---|---|---|
| 2004/0079740 A1* | 4/2004 | Myers et al. | 219/130.51 |
| 2005/0051524 A1* | 3/2005 | Blankenship et al. | 219/130.51 |
| 2005/0269297 A1* | 12/2005 | Buda et al. | 219/110 |
| 2006/0070983 A1* | 4/2006 | Narayanan et al. | 219/130.51 |
| 2007/0056944 A1 | 3/2007 | Artelsmair | |
| 2007/0262065 A1* | 11/2007 | Peters et al. | 219/130.5 |
| 2008/0083714 A1* | 4/2008 | Kamath et al. | 219/121.57 |
| 2009/0026188 A1 | 1/2009 | Schorghuber | |
| 2011/0114615 A1* | 5/2011 | Daniel et al. | 219/137 R |
| 2011/0278273 A1 | 11/2011 | Hirota et al. | |
| 2012/0118865 A1* | 5/2012 | Stava et al. | 219/130.31 |

* cited by examiner

METHOD AND SYSTEM TO CONTROL HEAT INPUT IN A WELDING OPERATION

PRIORITY

The present application claims priority to U.S. Provisional Patent Application No. 61/723,522 filed Nov. 7, 2012, which is incorporated herein by reference in its entirety.

TECHNICAL FIELD

This invention relates to systems and methods for welding. More specifically, the subject invention relates to systems and methods to control heat input while welding.

BACKGROUND

When arc welding it is desirable to control heat input during welding. The welding arc generates a very high amount of heat which can significantly increase the temperature of the workpiece around the weld zone. This increase in temperature can be disadvantageous outside of the weldzone because it can detrimentally affect the material properties of the workpiece as well as cause warping, etc. Efforts to control the temperature of the workpiece include applying external cooling to the workpiece or changing the welding process. However, these methods can be complicated and provide limited results, Further limitations and disadvantages of conventional, traditional, and proposed approaches will become apparent to one of skill in the art, through comparison of such approaches with embodiments of the present invention as set forth in the remainder of the present application with reference to the drawings.

SUMMARY

Embodiments of the present invention include systems for and methods of arc welding in which a desired heat input is maintained by adjusting various parameters of the electrode negative portion of a welding waveform, as well as other aspects of the welding process. In some exemplary embodiments, only the electrode negative portion of the welding waveform is adjusted to obtain a waveform balance which maintains a desired arc length and/or voltage, while at the same time minimizing heat input into the weld and keeping the arc stable.

In an exemplary embodiment, a system includes an arc welding power supply configured to output a welding waveform to a welding torch. The welding power supply includes a waveform generator to generate an output welding waveform. The power supply also includes a controller to optimize the output welding waveform based on one of a desired RMS voltage set point and a desired RMS voltage range. The optimization is performed by adjusting at least one of a power ratio and a duration ratio. The power ratio is a ratio of a power of a negative portion of the welding waveform to a power of a positive portion of the welding waveform, and the duration ratio is a ratio of a duration of a negative portion of the welding waveform to a duration of a positive portion of the welding waveform.

In another exemplary embodiment, a method of controlling an arc welding system includes providing a welding torch, generating a welding waveform, and transmitting the welding waveform to the welding torch. The method further includes optimizing the welding waveform based on one of a desired RMS voltage set point and a desired RMS voltage range. The optimization is performed by adjusting at least one of a power ratio and a duration ratio. The power ratio is a ratio of a power of a negative portion of the welding waveform to a power of a positive portion of the welding waveform, and the duration ratio is a ratio of a duration of a negative portion of the welding waveform to a duration of a positive portion of the welding waveform.

These and other features of the claimed invention, as well as details of illustrated embodiments thereof, will be more fully understood from the following description and drawings.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Figure 1:
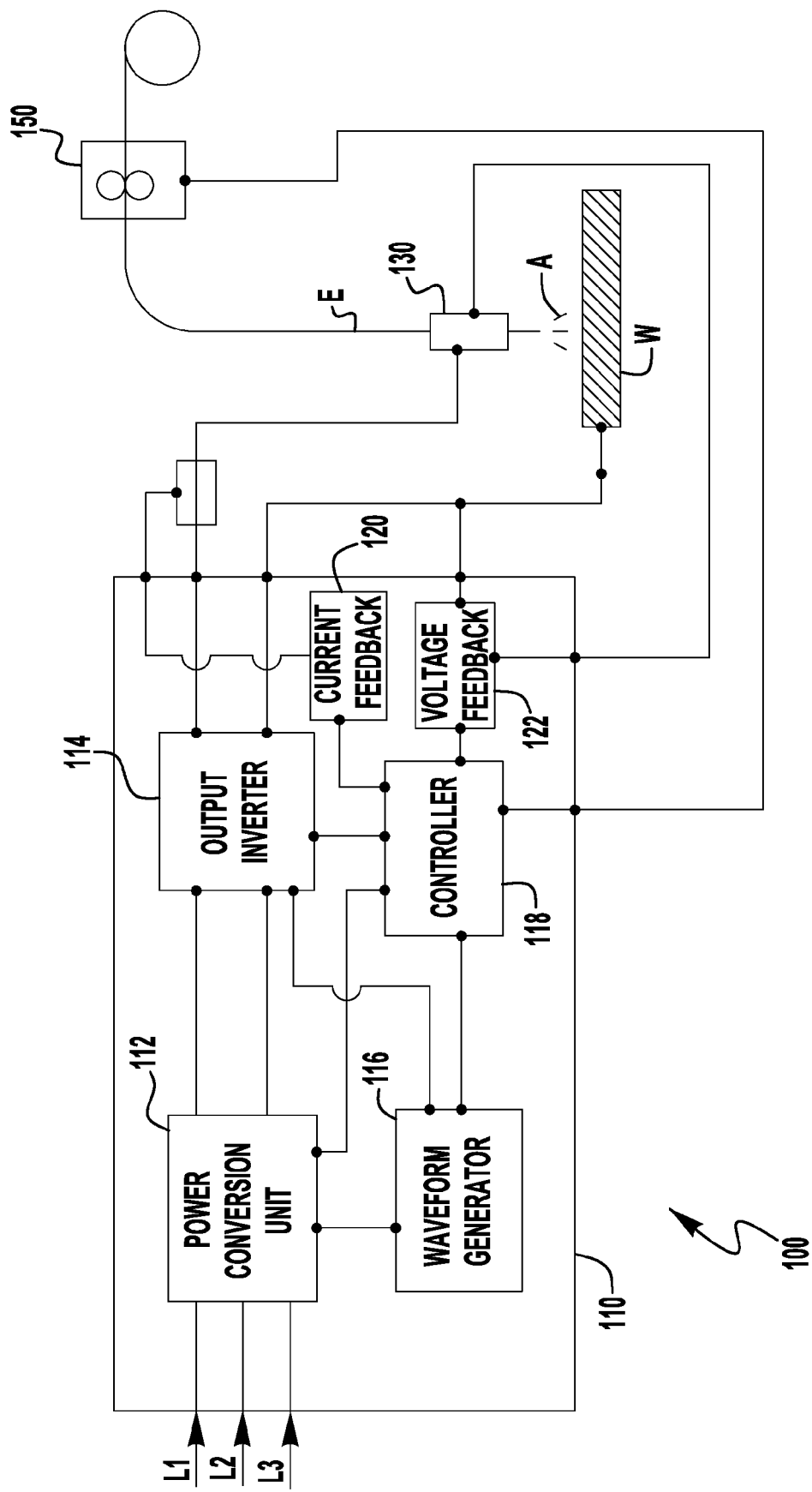
FIG. 1 is a diagrammatical representation of a welding system in accordance with an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIG. 1 is an illustrative embodiment of a welding system 100 in accordance with exemplary embodiments of the present invention. The welding system contains a welding power supply 110 which delivers a welding waveform to a welding torch 130 and a workpiece W through an electrode E to generate a welding arc A. The electrode E is delivered to the welding operation via a wire feeder 150. The wire feeder 150 can be of any known construction such that it is capable of delivering the electrode E to the weld and, in some embodiments, the wire feeder 150 can adjust the wire feed speed of the electrode E based on a signal from the power supply 110—which will be discussed in more detail below.

The general construction of the power supply 110 can be similar to that of known power supplies that are capable of GMAW/MIG type welding operations, so long as the power supply 110 is capable of functioning and operating as described herein. For example, the power supply 110 can be constructed similar to that of the Power Wave® type power supplies, manufactured by The Lincoln Electric Company, of Cleveland, Ohio. Of course, embodiments of the present invention are not limited to such a construction, and this is intended to be merely exemplary.

As shown in FIG. 1, the power supply 110 is capable of receiving an input signal through L1, L2 and L3. FIG. 1 depicts a 3-phase input, but other embodiments can utilize only a single phase input. The power supply 110 contains a power conversion unit 112 which is capable of receiving the input signal and outputting a signal to an output phase (such as output inverter 114) so that the output of the power supply 110 is capable of sustaining a welding arc. The power conversion unit 112 can be made up of a number of different components. For example, it can be comprised of a rectifier circuit and a buck-boost circuit which receives the rectified signal and outputs a constant voltage to the output inverter 114. Of course in other exemplary embodiments, the output inverter 114 can be a chopper, or any other type of output circuit that is capable of working with the power conversion unit 112 to output a welding signal. The power supply 110 also contains a waveform generator 116 which is a circuit which aids in controlling the output of at least one of, or both, of the power conversion unit 112 and the output inverter 114 to provide the desired welding waveform to be used to generate the arc A. For example, the waveform generator 116 can be used to generate a desired current waveform used to create and maintain the arc A during welding, coupled with one or both of the power conversion unit 112 and the output inverter 114 (or whatever output component is utilized). In addition, the power supply has a controller 118, which can be any type of CPU or processor-type device capable of controlling functions and operations of the power supply 110. Such controllers are generally known. In exemplary embodiments, the controller received feedback from a current feedback circuit 120 and a voltage feedback circuit 122 which provide current and voltage feedback (respectively) from the welding arc A during a welding operation. With this feedback, the controller 118 is able to adjust and optimize the performance of the power supply 110 to provide the desired output. This will be discussed further below.

As shown in FIG. 1, in some embodiments, the controller 118 is also coupled to a wire feeder 150 which allows the controller to receive feedback from the wire feeder 150 as well as control the operation of the wire feeder 150, such as wire feed speed, during a welding operation. This is also discussed below.

Figure 2:
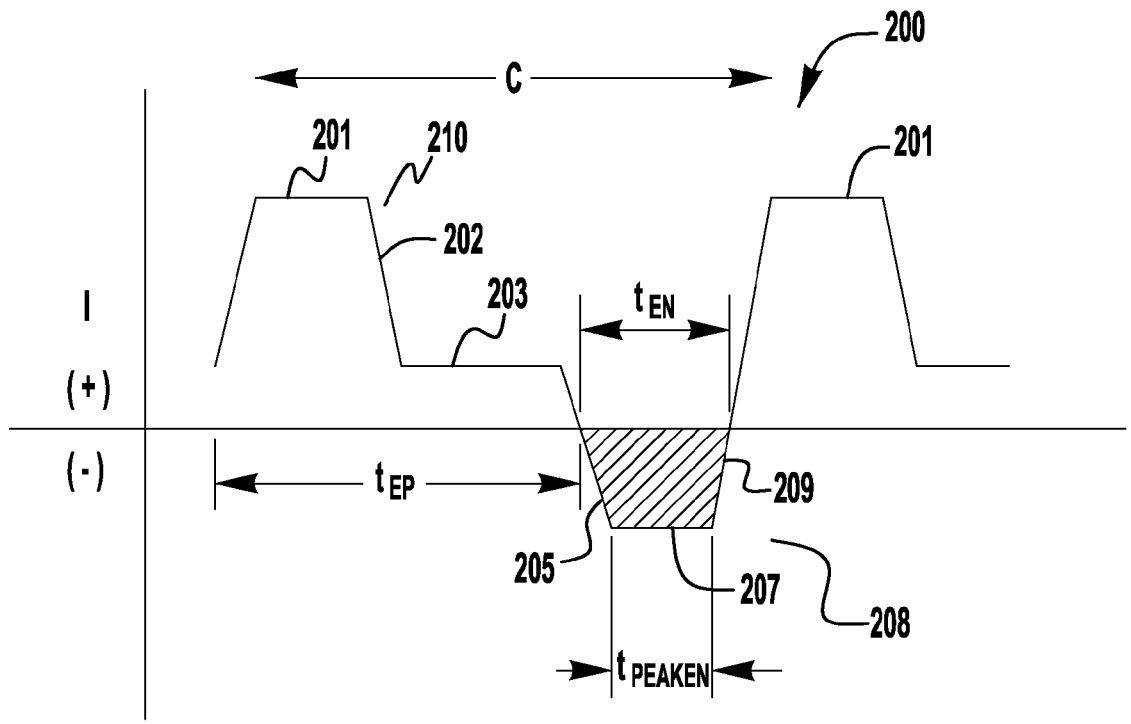
FIG. 2 is a diagrammatical representation of a welding waveform to be used with embodiments of the invention.

FIG. 2 depicts an exemplary current waveform 200 that can be used with embodiments of the present invention. As a general note, the waveform 200 depicted is a generic pulse waveform that is intended to be representative of the many different types of welding current waveforms that can be used in welding operations, especially GMAW/MIG type operations, and embodiments of the present invention are not limited to using current waveforms as depicted in FIG. 2, or in any of the Figures discussed herein. As shown, the waveform 200 has a both an electrode positive (EP) portion 210 and an electrode negative (EN) portion 208 in each cycle C. The EP portion 210 of the waveform 200 is that time in the waveform in which the welding electrode E has a positive polarity (current is flowing from the electrode E into the workpiece W), while during the EN portion 208 the electrode E has a negative polarity such that the current is flowing from the workpiece W into the electrode E.

Each EP portion 210 comprises a pulse 202 having a peak current 201 and a background current level 203 following the peak 201, where the background current level is less than the peak 201 current level. Between the background portion 203 and the following peak 201 of the next cycle C is an EN portion 208. In exemplary embodiments, the EN portion 208 comprises an EN ramp-up portion 205, an EN peak portion 207 and an EN ramp down portion 209. The EN portion 208 has a total duration $t_{EN}$ and a peak duration $t_{PEAKEN}$.

Because each of the EP and EN portions of the waveform 200 have a current and voltage component (voltage is not shown) each portion 210 and 208 is providing power. Thus, each cycle C has a negative power ratio equal to EN Power/EP Power, where EN Power is the total power input by the EN portion 208 and the EP Power is the total amount of power input by the EP portion 210.

During welding, the EN portion 208 of the cycle C provides less heat input into the weld puddle as compared to the EP portion 210. However, the EN portion 208 provides more efficient melting of the advancing electrode E during welding than the EP portion 210. Various embodiments of the present invention employs these attributes of the respective portions of the cycle C to control and optimize heat input into the weld, while at the same time maintaining a stable arc length. This will be discussed in detail below.

During welding, there are a number of different events that can change the arc length and/or the voltage of the arc A, between the electrode E and the workpiece W. For example, in semi-automated welding, the arc length between the electrode E and the workpiece W changes as the torch 130 is moved closer and further away from the workpiece W due to welder error and/or due to changes in the surface of the workpiece W. As these changes occur, the arc A can become unstable or otherwise adversely affect the weld integrity by affecting the heat input into the weld, as well as many other adverse affects. Embodiments of the present invention aid in alleviating or eliminating these adverse affects by providing systems and methods to easily control the arc length and heat input into a weld.

As shown in FIG. 2, and discussed above, embodiments of the present invention employ an EN portion 208 in cycles C of the waveform 200. This EN portion 208 of the cycle C is generally shorter (in duration) than the EP portion 210 but can "burn back" the electrode E more efficiently than the EP portion 210, resulting in a "cooler" arc. As such the EN portion 208 can be used to aid in maintaining a desired arc length of the arc A. It should be noted that embodiments of the present invention can be used in both an AC type waveform, or a generally DC waveform which intermittently uses AC as described herein.

In exemplary embodiments, during welding the power supply 110 monitors both the arc current and voltage and provides that information to the controller 118. For example, the controller 118 can monitor the RMS voltage of the welding waveform 200 during welding. This monitored RMS voltage is compared to a desired or preset RMS voltage for the welding operation. The desired or preset RMS voltage is preset by the power supply 110 (for example by the controller 118) by using various user input information regarding the welding operation. For example, the user can input information such as current, wire feed speed, desired waveform function, electrode E and/or workpiece W information, voltage, or any other commonly used input data. The controller 118 then uses this information to generate the desired waveform 200 as well as determine a desired RMS voltage or RMS voltage threshold (or range) for the waveform 200 during welding. The RMS voltage set point or range can be associated with a desired heat input which is to be maintained during the welding process.

Once the welding process begins, the RMS voltage of the welding waveform 200 is monitored and compared to the RMS voltage setpoint or range to determine if the welding operation is maintaining the desired RMS voltage. In some exemplary embodiments, the set point is a single RMS voltage that can be in the range of 15 to 30 volts. Of course, other set points can be used depending on the desired RMS voltage of the waveform 200. In other exemplary embodiments, the setpoint can be a range, meaning that any detected RMS voltage within the range is acceptable. For example, in some exemplary embodiments, the setpoint range can be a total of 1 volt (for example, between 24 and 25 volts). In other exemplary embodiments, the setpoint range can be a total of 3 volts (for example, between 24 and 27 volts). In exemplary embodiments, the power supply 110 and/or controller 118 can determine whether or not a single RMS set point or RMS voltage range can be used based on the user input weld information. That is, some welding operations may require more control and thus it is more desirable to use a RMS voltage setpoint as opposed to a desired RMS voltage range. The use of a voltage setpoint can provide a more aggressive control protocol for those welding operations that need such control and precision.

It should be noted that the discussions of the present herein are directed to embodiments that can use either a single RMS voltage threshold or an RMS voltage range to control the welding processes. However, for purposes of clarity and efficiency an RMS voltage setpoint is used in the following exemplary discussions, but the discussions are equally applicable to using a desired RMS voltage range.

As the welding operation progresses, and the RMS voltage of the welding waveform 200 is monitored, the controller 118 determines if the actual RMS voltage is at, below, or above the desired RMS voltage setpoint (for example, 25 volts). If the actual RMS voltage is below the setpoint this is a sign that voltage of the arc A is dropping, which can mean that the arc length is decreasing and/or that the resistance of the welding circuit is decreasing (which can occur for various reasons). If this change is due to the fact that the arc length is decreasing the electrode E is getting closer to the workpiece W which can destabilize the arc or increase the risk of a short circuit. Alternatively, if the actual RMS voltage is increasing relative to the setpoint this could mean that the arc length is getting too long as the electrode E is pulled away from the workpiece W.

Embodiments of the present invention then use this information to adjust the EN portion 208 of the waveform 200 such that the negative power ratio of the waveform 200 changes to return the waveform 200 to the desired RMS voltage setpoint. For example, if it is determined that the actual RMS voltage is below the setpoint (indicating an arc length which is too short) the power supply 110 (using controller 118, waveform generator 116, power conversion unit 112 and/or output inverter 114) increase the negative power ratio—by increasing the amount of EN Power output to the arc A. By increasing the amount of EN Power, relative to EP Power, the electrode E can be burned back at a faster or more efficient rate, without overly increasing the heat input into the weld. Conversely, when it is detected that the RMS voltage is higher than the setpoint the power supply 110 decreases the negative power ratio, by decreasing the EN Power. This results in slowing down the consumption of the electrode E allowing the arc length to be shortened—but again without adversely affecting the heat input. In exemplary embodiments of the present invention, no change is made to the EP portion 210 of the waveform 200 or the frequency of the waveform. Thus, embodiments of the present invention only use changes to the EN portion 208 of the waveform 200 to maintain the desired RMS voltage. This allows optimal arc length control with minimal or no adverse affects to the heat input of the weld. In other exemplary embodiments, the negative power ratio is changed without making any changes to positive pulses 202 of the waveform. That is the peak 201, duration and ramp rates of the positive pulses 202 remaining unchanged, but changes can be made to the duration of the background portion 203 of the EP portion 210.

Embodiments of the present invention can utilize adjustment to various aspects of the EN portion 208 to achieve the desired RMS voltage. For example, changes to the EN portion can include changes to the lead current ramp rate 205, the peak 207—through changes to magnitude or $t_{PEAKEN}$, the trail current ramp rate 209, and/or the duration $t_{EN}$ of the EN portion 208. That is, the power supply 110 can adjust any one, any combination, or all of these parameters of the EN portion 208 to change the negative power ratio to drive the RMS voltage of the waveform 200 to the setpoint RMS voltage.

Embodiments of the present invention can use various feedback or control methodologies to control the negative power ratio of the waveform 200. For example, the power supply 110 can continuously monitor the actual RMS voltage (within the systems designed update rate) and adjust the negative power ratio as soon as deviations are detected. In exemplary embodiments of the present invention, the update rate for the RMS voltage is in the range of 1 to 10 KHz. Of course other update rates can be used without departing from the scope or spirit of the present invention. Other embodiments can use different feedback methodologies. For example, the power supply 110/controller 118 can monitor the average RMS voltage of the waveform 200 over a plurality N of cycles of the waveform 200 or over a period of time and compare the determined average RMS voltage with the setpoint value to determine if a change in the negative power ratio should be made. Of course other control methodologies can be used without departing from the spirit or scope of the present invention.

In another exemplary embodiment, the power supply 110 and/or controller 118 monitors the RMS voltage (based on the update or sample rate of the system used) to determine if a deviation from the setpoint is detected but does not change the waveform 200 until after a plurality of sequential deviations are detected. Such embodiments avoid changing the waveform 200 based on the detection of anomalies that are short in duration and self correct in a short amount of time. For example, in an exemplary embodiment, the system compares the detected RMS voltage to the setpoint and if a deviation is detected the controller 118 starts a counter which counts the number of sequential deviations following the first. When the number of sequential deviations detected exceeds a desired amount, the negative power ratio is changed as described herein. For example, the sequential number of deviations detected can be in the range of 5 to 20. In some embodiments, if the detected RMS voltage returns to the setpoint prior to reaching the predetermined number of sequential deviations no change in the waveform 200 will be made and the counter will be reset to zero.

In other exemplary embodiments, the update rate for the detection of the actual RMS voltage changes when a deviation is detected. For example, during welding a first update rate is used and when a deviation is detected the update rate changes to quicker update rate to monitor the actual RMS voltage and provide the negative power ratio adjustment.

It is noted that in other exemplary embodiments of the present invention, the power supply 110 changes the negative duration ratio, where the negative duration ratio is $t_{EN}/t_{EP}$. In such an embodiment, the power supply 110 adjusts the duration $t_{EN}$ of the EN portion 208 so that the waveform has an EN state for a longer duration. In such an embodiment, even though the peak current 207 of the EN portion 208 is reduced, the increased duration of the EN portion 208 will result in faster melting of the electrode E to aid in maintaining a desired RMS voltage, and thus arc length.

Figure 3:
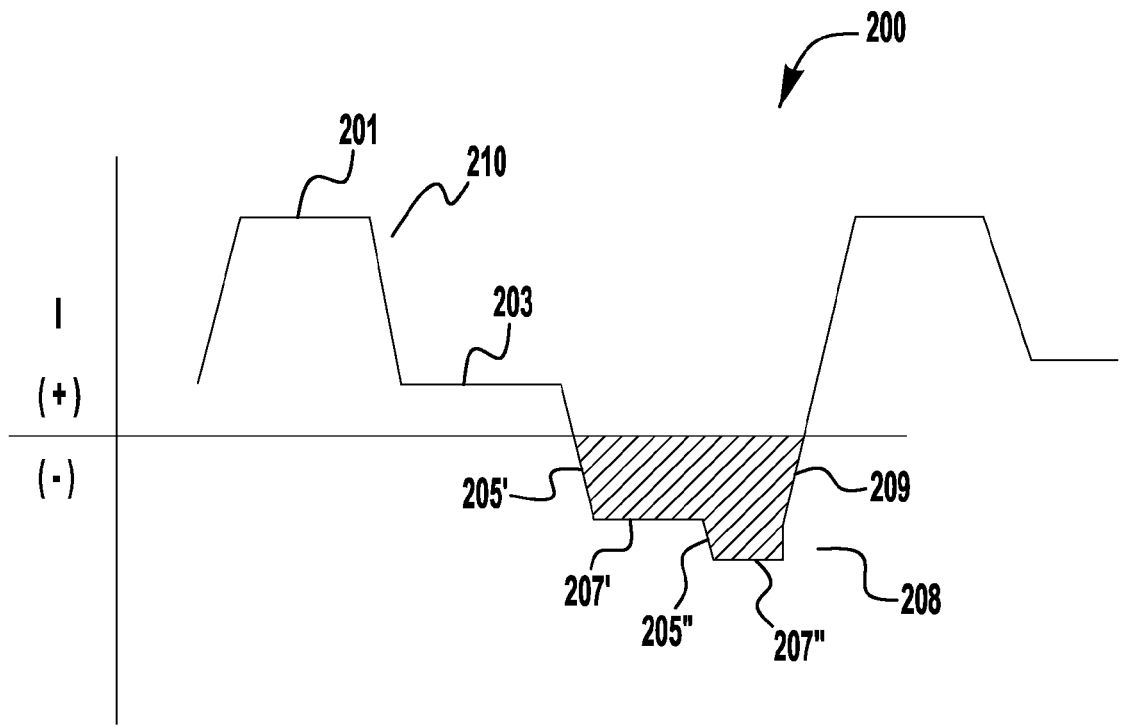
FIG. 3 is a diagrammatical representation of another welding waveform to be used with embodiments of the invention.

FIG. 3 depicts another exemplary embodiment of a waveform 200 that can be generated by the power supply 110. In this embodiment, the power supply 110 monitors the change and/or rate of change in actual RMS voltage and if the change/rate of change is outside of an acceptable or predetermined threshold the power supply adjusts its current output during the EN portion 208 to reach an acceptable change/rate of change in the RMS voltage. An example is shown in FIG. 3. As shown, the EN portion 208 has a first stage defined by a first ramp rate 205' and a first peak level 207'. However, if it is determined that the power, current and/or voltage of the first stage will not provide a desired output to reach the desired RMS voltage, the power supply 110 changes at least the current output in the EN portion 208 to a second peak level 207" at a second ramp rate 205", where the second peak level 207" is different than the first peak level 207'. For example, in some exemplary embodiments, the power supply 110 can output the first peak level 207' for a predetermined period of time (for example, in the range of 2 to 6 ms) and then if it is determined that the anticipated EN power will be insufficient (or too much) then a change in the EN portion 208 current output will be made—as shown. In FIG. 3 the second peak level 207" is shown as higher than that of the first peak level 207'—which is used to further burn back the electrode E. However, in other instances the power supply can lower the current level such that the second peak level 207" is less than that of the first if it is detected that too much power is being added in the EN portion 208. In fact, in other exemplary embodiments it can be determined that after the first stage a sufficient amount of change in the RMS voltage has occurred (or will occur) the power supply 110 will return the current to the positive background current level 203 before beginning the next pulse 201. This ensures that the desired RMS voltage is maintained without overcorrected or altering the frequency of the waveform 200.

It is noted that in some exemplary embodiments the waveform 200 is controlled such that the positive pulse 202 is started directly after the completion of the EN portion 208 of the waveform—see FIG. 2. However, in other embodiments this may not be the case. For example, as described above, embodiments can end the EN portion 208 early to reach/maintain a desired RMS voltage level. In such embodiments the current can return to the positive background 203 before beginning the next pulse, so that the waveform frequency is maintained.

Thus, in some exemplary embodiments the power supply 110 monitors the actual RMS voltage and when the actual RMS voltage reaches the setpoint the power supply 110 ends the EN portion 208 and goes to the EP portion 210, while maintaining the desired frequency of the waveform such that no frequency change occurs.

Figure 4:
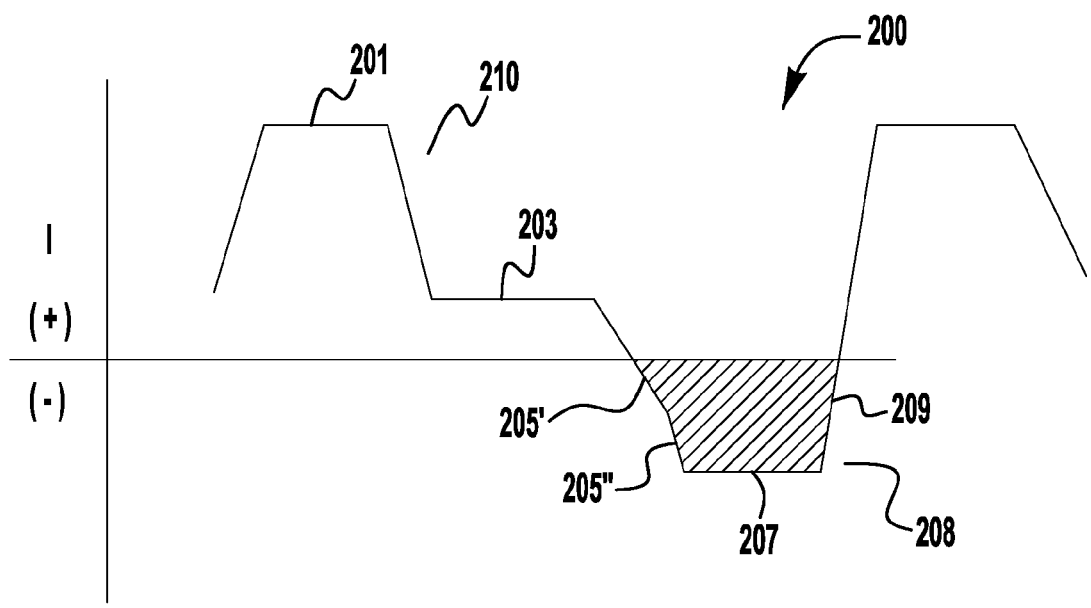
FIG. 4 is a diagrammatical representation of a further welding waveform to be used with embodiments of the invention.

FIG. 4 depicts another exemplary waveform 200 of the present invention. In this embodiment, the power supply 110 adjusts the ramp rate of the EN portion 208 based on RMS voltage feedback. Specifically, the power supply 110 utilizes a first ramp rate 205' for the EN portion 208 to reach the desired peak level 207 and monitors or determines the change in actual RMS voltage based on the first ramp rate 205'. If it is determined that the first ramp rate 205' will provide an insufficient change or an overly aggressive change to the RMS voltage then the power supply 110 adjusts the ramp rate to a second ramp rate 205", which is different than the first ramp rate 205" such that the desired RMS voltage setpoint is reached or the desired change in the RMS voltage is attained during the cycle C. The second ramp rate can be faster or slower than the first depending on the detected or desired changes to the RMS voltage.

It is noted that in some of the embodiments discussed above, the RMS voltage is monitored during the EN portion 208 such that when the desired RMS voltage is reached the waveform is then changed to EP to maintain the desired RMS voltage. However, in other embodiments it is not needed to fully correct the RMS voltage in a single cycle. For example, returning to the RMS voltage setpoint can occur over a plurality of cycles C where during each cycle C a percentage of the difference between the actual RMS voltage and setpoint is changed.

Various methods of control or control methodologies can be used to implement the described embodiments. For example, the controller 118 can utilize state tables, look up tables or algorithm type control methodologies to implement embodiments of the present invention. Such embodiments would utilize the detected RMS voltage and a voltage setpoint (or range) and use this information to determine the amount and type of change to the EN portion 208 of the waveform to maintain the desired RMS voltage. It is noted that embodiments of the present invention can change different aspects of the EN portion (for example, peak current ramp rates, duration) based on the deviation between the detected RMS voltage and the setpoint. Thus, in some embodiments a more aggressive change to the EN portion 208 can be made when the detected difference is large.

In further exemplary embodiments of the present invention, the power supply 110 and/or controller 118 can utilize changes in other aspects of the welding operation to reach or maintain a desired RMS voltage. For example, in some embodiments the controller 118 can control the wire feed speed of the wire feeder 150 in addition to changing the EN portion of the waveform 200 to achieve the desired RMS voltage output. In such embodiments, as the RMS voltage drops (indicating a decrease in length of the arc) the controller 118 can also cause the wire feeder 150 to slow the wire feed speed to aid in reaching or maintaining the desired RMS voltage (and thus arc length). Alternatively, if the RMS voltage increases above the setpoint (indicating an increase in arc length) the controller 118 can cause the wire feeder to increase its wire feed speed to aid in closing the gap between the electrode E and the workpiece W to maintain the desired RMS voltage.

Figure 5A:
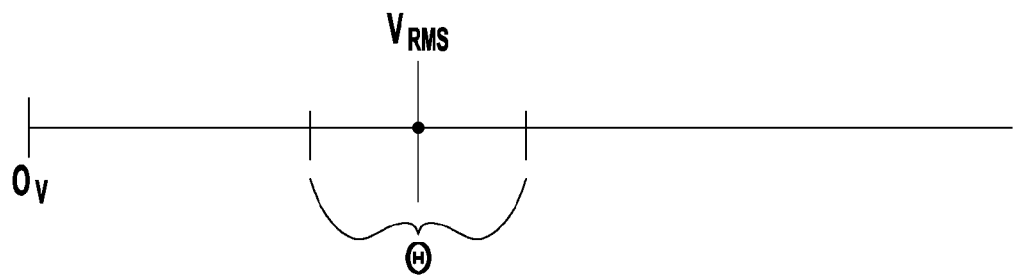
FIGS. 5A and 5B are pictorial representations of a control methodology that can be used with embodiments of the invention.

In some exemplary embodiments, the magnitude of deviation between the RMS voltage and the setpoint can determine the extent with which wire feed speed is utilized to aid in maintaining or returning to the setpoint. FIG. 5A can be utilized to aid in this discussion.

As shown in FIG. 5A, a power supply can have a RMS voltage setpoint $V_{RMS}$. (It should be noted that as discussed above, an operational range can be used for $V_{RMS}$—however, for purposes of this figure a setpoint is used). As shown, in some embodiments a first operational range θ is established around $V_{RMS}$. Although FIG. 5A depicts the first operational range θ as centered on $V_{RMS}$, this need not be the case in all embodiments. The first operational range θ has a range of voltage such that if the RMS voltage is within the first operational range θ a first RMS voltage change protocol is used to maintain the desired RMS voltage for the waveform 200, whereas if the RMS voltage is outside of the first operational range θ then a second RMS change protocol is used to maintain the desired RMS voltage. For example, if the determined RMS voltage is within the first operational range θ then the power supply 110/controller 118 uses adjustments only to the waveform 200 (as described above) to maintain the desired RMS voltage value, while if the RMS voltage is outside of the first operational range θ the controller 118 implements a change to the waveform 200 and to the wire feed speed to return to the desired RMS voltage. Of course, other parameters can be adjusted depending on whether or not the RMS voltage is within or outside of the first operational range θ. For example, when within the first operational range θ the power supply 110 may adjust one parameter (e.g., ramp rate, peak, duration) of the EN portion 208 and while outside the first operational range θ the power supply 110 will adjust at least two parameters (e.g., ramp rate, duration parameter) which may include the first parameter. Various embodiments can use different combinations of any of the parameters discussed herein to adjust the negative power ratio, the negative duration ratio, and/or the wire feed speed to adjust the RMS voltage to the setpoint.

Figure 5B:
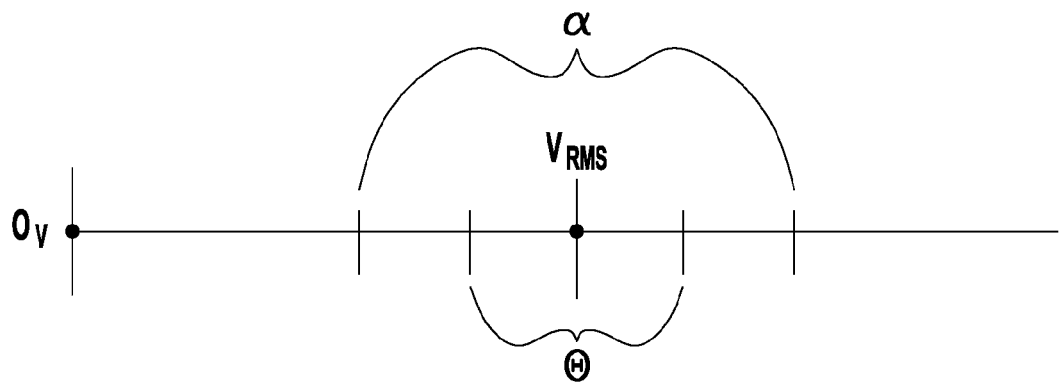

FIG. 5B represents another embodiment of the present invention, where there is a first operational range θ, which is used as discussed above, and a second operational range α, which is used similarly to that discussed above. That is, during the first operational range θ a first parameter or grouping of parameters is used to control RMS voltage, while in the second operational range α a second parameter or grouping of parameters is used to control RMS voltage, and when outside of the second operational range a third parameter or grouping of parameters is used to the control the RMS voltage of the waveform. For reference, the parameters that can be used include the negative power ratio, the negative duration ratio, current ramp rate(s), peak current, and duration of the EN portion, the wire feed speed, and current ramp rates, peak current and duration of the EP portion.

It is noted that exemplary embodiments of the present invention can also be used to control heat input into the welding operation. For example, the total heat input into the welding operation can be monitored or determined. For example, a thermal sensor can be used to monitor heat input into the weld and/or the current and/or voltage can be used to determine the overall amount of heat input into the weld. Based on this information the controller 118 can adjust the negative power ratio to either increase or decrease the heat input into the weld. In other exemplary embodiments, the heat can be calculated or determined by the controller 118, or other component. For example, the heat can be determined by utilizing the true energy in the arc and/or using true energy/wire deposited. Such methods are generally known, and need no be discussed in detail herein. Further, in other exemplary embodiments the heat can be determined by a combination of the sensor and calculations or determinations by the controller 118. That is, to increase the heat input into the weld the negative power ratio and/or the negative duration ratio is decreased (for example, by adjusting the EN portion of the waveform) and to decrease the heat input into the weld the negative power ratio and/or the negative duration ratio is increased (for example, by adjusting the EN portion of the waveform). However, to ensure that the arc length remains constant, and because adjustment of the EN portion 208 of the waveform will result in a different burn rate for the electrode E, the controller 118 also adjusts the wire feed speed of the electrode E in conjunction with changes to the waveform 200. That is, as the EN portion 208 of the waveform increases so does the wire feed speed—to compensate for the increased burn rate of the electrode E, and as the EN portion of the waveform decreases so does the wire feed speed—to compensate for the decreased burn rate of the electrode E.

In some exemplary embodiments of the present invention, even though the negative power ratio changes from one stage to another, the overall power generated by each cycle C does not change from one cycle C to the next. That is, the total cycle power for each cycle C of the waveform 200 does not change from cycle to cycle even though the negative power ratio changes as described herein. In such embodiments, the power provided during the welding process remains constant.

These above described embodiments, as well as others consistent with the scope described herein result in controlling and maintaining a desired arc length while minimizing heat input and without requiring changes in the frequency or EP portions of the waveform. Such control provides significant advantages over known control methodologies, which would increase heat input, change the welding frequency or otherwise modify all aspects of the waveform.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. An arc welding power supply configured to output a welding waveform to a welding torch, the welding power supply comprising:
    a waveform generator to generate an output welding waveform; and
    a controller to optimize the output welding waveform based on one of a desired RMS voltage set point and a desired RMS voltage range, where said one of said desired RMS voltage set point and said desired RMS voltage range is utilized to reach a desired heat input for a welding operation where said desired heat input is determined by said controller based on user input information,
    wherein the optimization of the output welding waveform optimizes the heat input and is performed by adjusting at least one of a power ratio and a duration ratio,
    wherein the power ratio is a ratio of a power of a negative portion of the welding waveform to a power of a positive portion of the welding waveform, and
    wherein the duration ratio is a duration of a negative portion of the welding waveform to a duration of a positive portion of the welding waveform.

2. The arc welding power supply of claim 1, wherein the controller is configured to receive an RMS voltage signal corresponding to an arc length, and
    wherein the controller is configured to compare the RMS voltage signal to the one of a desired RMS voltage set point and a desired RMS voltage range and perform the optimization based on the comparison.

3. The arc welding power supply of claim 1, wherein the optimization is performed by adjusting the duration of the negative portion of the welding waveform while keeping a frequency of the welding waveform constant.

4. The arc welding power supply of claim 2, wherein the one of a desired RMS voltage set point and a desired RMS voltage range is selected based on a desired arc length.

5. The arc welding power supply of claim 2, wherein the desired RMS voltage range is between 15 volts and 30 volts.

6. The arc welding power supply of claim 2, wherein the desired RMS voltage set point is 25 volts.

7. The arc welding power supply of claim 2, wherein the one of a desired RMS voltage set point and a desired RMS voltage range is selected based on at least one of a welding current, a wire feed speed, a desired waveform function, electrode information, workpiece information, and welding voltage.

8. The arc welding power supply of claim 2, wherein the controller adjusts a power of the negative portion of the waveform including adjusting at least one of a peak current magnitude, a peak current duration, a current ramp rate, and the duration of the negative portion of the waveform.

9. The arc welding power supply of claim 2, wherein the negative portion of the waveform is ramped to a first peak level and then ramped to a second peak level that is different from the first peak level if the first peak levels fails to optimize the welding waveform.

10. The arc welding power supply of claim 2, wherein the negative portion of the waveform is ramped to a peak level at a first ramp rate and then ramped at a second ramp rate that is different from the first ramp rate if the first ramp rate fails to optimize the welding waveform.

11. An arc welding system, comprising:
a welding torch;
a welding power supply comprising,
   a waveform generator to generate an output welding waveform, and
   a controller to optimize the output welding waveform based on one of a desired RMS voltage set point and a desired RMS voltage range, where said one of said desired RMS voltage set point and said desired RMS voltage range is utilized to reach a desired heat input for a welding operation where said desired heat input is determined by said controller based on user input information,
wherein the optimization of the output welding waveform optimizes the heat input and is performed by adjusting at least one of a power ratio and a duration ratio,
wherein the power ratio is a ratio of a power of a negative portion of the welding waveform to a power of a positive portion of the welding waveform, and
wherein the duration ratio is a duration of a negative portion of the welding waveform to a duration of a positive portion of the welding waveform.

12. The arc welding system of claim 11, wherein the controller is configured to receive an RMS voltage signal corresponding to an arc length, and wherein the controller is configured to compare the RMS voltage signal to the one of a desired RMS voltage set point and a desired RMS voltage range and perform the optimization based on the comparison.

13. The arc welding system of claim 11, wherein the optimization is performed by adjusting the duration of the negative portion of the welding waveform while keeping a frequency of the welding waveform constant.

14. The arc welding system of claim 12, wherein the one of a desired RMS voltage set point and a desired RMS voltage range is selected based on a desired arc length.

15. The arc welding system of claim 12, wherein the desired RMS voltage range is between 15 volts and 30 volts.

16. The arc welding system of claim 12, wherein the desired RMS voltage set point is 25 volts.

17. The arc welding system of claim 12, wherein the desired RMS voltage set point or the desired RMS voltage range is selected based on at least one of a welding current, a wire feed speed, a desired waveform function, electrode information, workpiece information, and welding voltage.

18. The arc welding system of claim 12, wherein the controller adjusts a power of the negative portion of the waveform including adjusting at least one of a peak current magnitude, a peak current duration, a current ramp rate, and the duration of the negative portion of the waveform.

19. The arc welding system of claim 12, wherein the negative portion of the waveform is ramped to a first peak level and then ramped to a second peak level that is different from the first peak level if the first peak levels fails to optimize the welding waveform.

20. The arc welding system of claim 12, wherein the negative portion of the waveform is ramped to a peak level at a first ramp rate and then ramped at a second ramp rate that is different from the first ramp rate if the first ramp rate fails to optimize the welding waveform.

* * * * *